United States Patent
Mertens

(10) Patent No.: US 11,064,232 B2
(45) Date of Patent: Jul. 13, 2021

(54) MEDIA BROADCAST SYSTEM

(71) Applicant: Sawax USA LLC, Lewes, DE (US)

(72) Inventor: Francois-Louis Mertens, Los Angeles, CA (US)

(*) Notice: Subject to any disclaimer, the term of this patent is extended or adjusted under 35 U.S.C. 154(b) by 0 days.

(21) Appl. No.: 16/591,497

(22) Filed: Oct. 2, 2019

(65) Prior Publication Data

US 2021/0105512 A1    Apr. 8, 2021

(51) Int. Cl.
| | |
|---|---|
| G06F 3/00 | (2006.01) |
| G06F 13/00 | (2006.01) |
| H04N 5/445 | (2011.01) |
| H04N 21/2365 | (2011.01) |
| H04N 21/2187 | (2011.01) |
| H04N 21/2743 | (2011.01) |
| H04N 21/4784 | (2011.01) |
| H04N 21/4223 | (2011.01) |
| H04N 21/442 | (2011.01) |
| H04N 21/6587 | (2011.01) |

(52) U.S. Cl.
CPC ..... *H04N 21/2365* (2013.01); *H04N 21/2187* (2013.01); *H04N 21/2743* (2013.01); *H04N 21/4223* (2013.01); *H04N 21/44204* (2013.01); *H04N 21/4784* (2013.01); *H04N 21/6587* (2013.01)

(58) Field of Classification Search
CPC .......... H04N 21/2365; H04N 21/2187; H04N 21/2743; H04N 21/4223; H04N 21/44204; H04N 21/4784; H04N 21/6587
See application file for complete search history.

(56) References Cited

U.S. PATENT DOCUMENTS

| | | |
|---|---|---|
| 4,778,091 A | 10/1988 | Barto |
| 4,793,534 A | 12/1988 | Berry |
| 5,586,703 A | 12/1996 | Radar et al. |
| 5,603,441 A | 2/1997 | Easter |
| 5,630,536 A | 5/1997 | Bugnaski |
| 5,657,917 A | 8/1997 | Johnson et al. |
| 5,799,851 A | 9/1998 | Wulf et al. |
| 6,135,333 A | 10/2000 | Tucker et al. |
| 6,402,003 B1 | 6/2002 | Jackson |
| 7,681,769 B2 | 3/2010 | Kramer |
| 7,996,921 B1 | 8/2011 | Snyder |
| 8,539,354 B2 | 9/2013 | Beswick et al. |
| 8,896,652 B2 | 11/2014 | Ralston |
| 9,369,670 B2 | 6/2016 | Clavel et al. |
| 9,661,256 B2 | 5/2017 | Segal et al. |
| 9,787,945 B2 | 10/2017 | Segal et al. |

(Continued)

*Primary Examiner* — Kyu Chae
(74) *Attorney, Agent, or Firm* — Cohen IP Law Group, PC; Michael N. Cohen

(57) ABSTRACT

Aspects of the present disclosure include systems, apparatuses and methods of instituting an online broadcasting system. The system may combine live video streaming, video on demand (VOD), messaging and other content provided by an owner of the live broadcast and by the owner's online followers. The media content may be combined into a single broadcast stream. The owner of the broadcast may use an online control room to choose in real time what stream of content to provide to his/her followers. A gaming and/or revenue sharing component may also be provided wherein the owner and the followers may earn points for viewing and/or interacting with sponsored media through the system.

20 Claims, 20 Drawing Sheets

(56) References Cited

U.S. PATENT DOCUMENTS

| | | | |
|---|---|---|---|
| 10,033,967 B2 | 7/2018 | Segal et al. | |
| 2004/0060954 A1 | 4/2004 | Hale et al. | |
| 2007/0283398 A1* | 12/2007 | Bowles | H04N 21/47202 |
| | | | 725/86 |
| 2012/0133727 A1 | 5/2012 | Bolduc et al. | |
| 2012/0152991 A1 | 6/2012 | Roane | |
| 2012/0324006 A1 | 12/2012 | Garofalo | |
| 2013/0047123 A1 | 2/2013 | May et al. | |
| 2014/0006977 A1 | 1/2014 | Adams | |
| 2014/0168354 A1 | 6/2014 | Clavel et al. | |
| 2014/0239030 A1 | 8/2014 | Roth et al. | |
| 2018/0160163 A1* | 6/2018 | Thomas | H04L 67/06 |
| 2018/0227632 A1* | 8/2018 | Rubin | H04N 21/44222 |
| 2018/0242039 A1* | 8/2018 | Asnis | H04N 21/84 |
| 2018/0309806 A1 | 10/2018 | Huynh et al. | |
| 2018/0375676 A1* | 12/2018 | Bader-Natal | H04L 65/403 |
| 2019/0020853 A1 | 1/2019 | Segal | |
| 2019/0028526 A1* | 1/2019 | Beckham, Jr. | H04L 65/4076 |
| 2019/0261039 A1* | 8/2019 | Woschank | H04N 21/25435 |
| 2019/0313150 A1* | 10/2019 | Cava | H04N 21/812 |

* cited by examiner

CRn

MEDIA BROADCAST SYSTEM

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

The field of the current invention generally regards systems and methods for deploying online media, including broadcasting live video streaming, VOD and other content in a single stream in real time through use of an online control room.

BACKGROUND OF THE INVENTION

Live video streaming is commonplace on the Internet, as is video on demand (VOD). Both types of streaming entertainment are extremely popular, and millions of users interact with them every day.

However, there is no platform or tool that facilitates the combining of live video streaming and video on demand into a single live broadcast stream that an individual may control and disseminate online in real time to a multitude of followers without the need for particular hardware.

In addition, there are no platforms that reward participants for watching online media and/or participating in real time with an online broadcaster.

Accordingly, there is a need for an interactive media system and method of combining live video streaming and VOD video into a single live broadcast stream. There also a need for control mechanism (e.g., an online control room) that the user may use to select what streams to make available to his/her followers during the broadcast. There is also a need for a platform that rewards participants for interacting with the interactive media system.

BRIEF DESCRIPTION OF THE DRAWINGS

Various objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
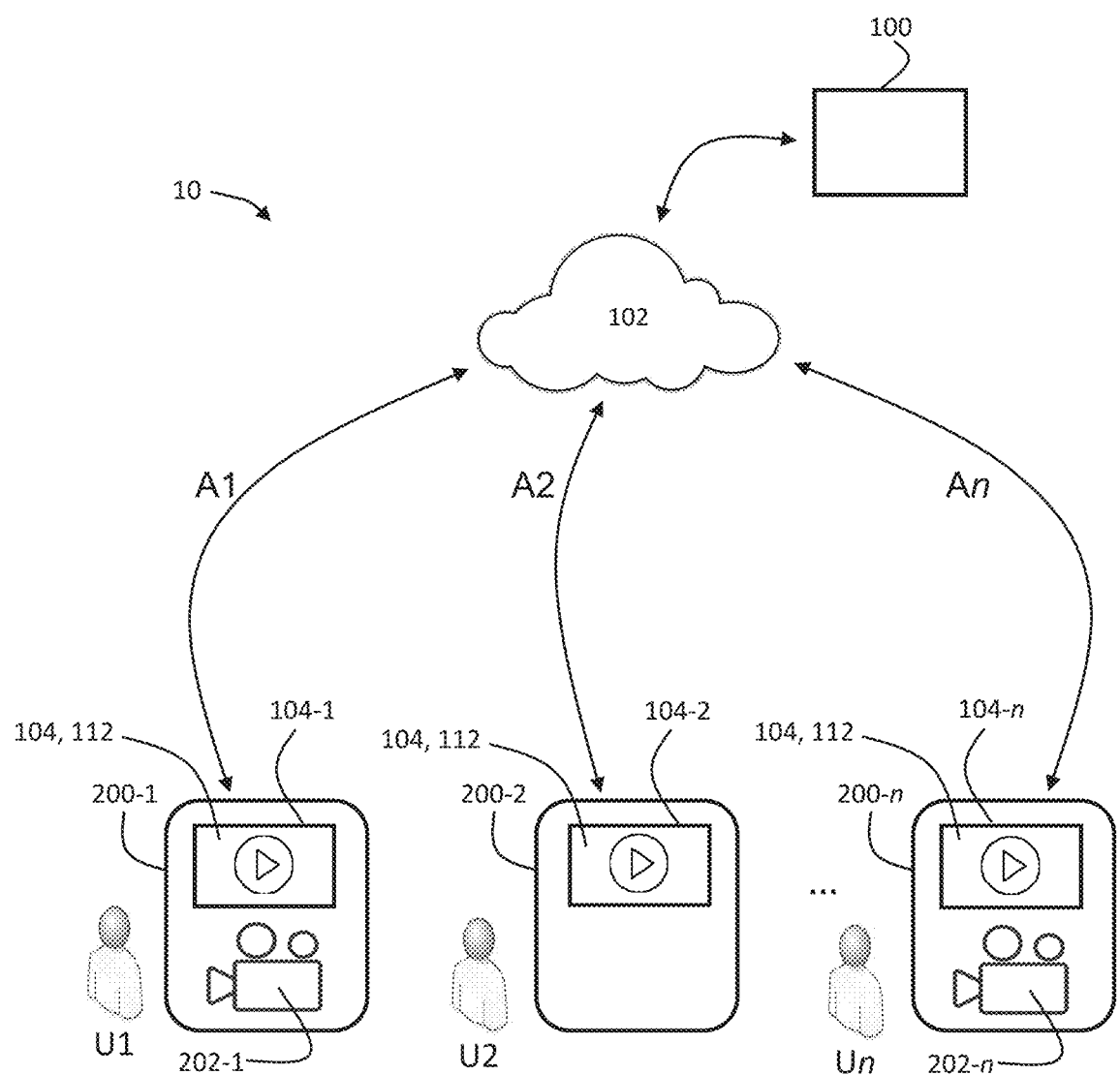
FIGS. 1-3 show aspects of an online broadcasting system according to exemplary embodiments hereof.

In general, and according to exemplary embodiments hereof, the current invention includes a system and method for broadcasting live video streaming combined with video on demand (VOD) within a single broadcast stream and shared between an owner of a web based online broadcasting channel and his/her participants (followers), all in real time. In general, the owner of a channel may broadcast a "live show" to his/her followers that may consist of live video streaming, VOD video and other content. The system and method also includes a gaming component wherein members may receive points for interacting with content that may be redeemed for cash, prices, services, donations, etc.

The system and method of the current invention will now be described in further detail with reference to FIGS. 1-20. The following detailed description is not intended to limit the current invention. Alternate embodiments and variations of the subject matter described herein will be apparent to those with ordinary skill in the art. Where the same or similar components appear in more than one figure, they are identified by the same or similar reference numerals.

As depicted in FIG. 1, the system 10 may include a cloud platform 100 that may provide a web-based experience through a network 102 (e.g., the Internet) between an owner Uo of a channel and his/her users U1, U2, . . . Un (also known in the art as followers). The owner Uo and the users Un may utilize devices 200-$n$ such as a smart phones, tablet computers, desktop computers, laptop computers, other types of controllers that may communicate with the cloud platform (e.g., through use of a web browser and/or a mobile application) and any combination thereof.

The cloud platform 100 may comprise one or more servers that may include Internet servers, LAN servers, WAN servers, or other types or combinations of types of generally networked servers. Accordingly, the cloud platform 100 may include central processing units (CPUs), microprocessors, microcontrollers, memory, databases, storage, operating systems, software and other components and systems that may be required to run, manage, deploy and otherwise operate and control the programs and applications that may run within the system 10.

The cloud platform 100 may provide one or more web sites 104 that may include video players 116, messaging applications 110 and other applications that the channel owners Uo and the users Un may interact with via their devices 200 in real time. The system 10 may also integrate any or all of the applications 116, 110 into one or more mobile applications 112 that may be downloaded and run on the owner's and/or users' devices 200.

Some of the user's devices 200 may include cameras 202 that may capture live video of the respective users Un that may then be provided to the cloud platform 100. For example, as shown in FIG. 1, user's U1 device 200-1 may include a camera 202-1 but user's U2 device 200-2 may not. The live video streams of each participant may be provided to the system 10 and to the owner Uo, and depending on the discretion of the owner Uo of the control room CRn, one or more of the video streams may also be shown to the users Un.

The owners Uo and the users Un may also have VOD files that they may share or otherwise make available through the system 10 to the other members Un. This will be described in detail in other sections.

Through use of the system 10, the owners Uo of individual broadcast channels may control the content that his/her followers Un may view. The content may come from a variety of sources, including but not limited to, live streaming video of the owner Uo, live streaming of a particular user Un, video files provided by the owner Uo, video files provided by a particular user Un, video files provided by a sponsor or other third-party entity, other types of video and any combination thereof. In some embodiments hereof, content from each source may be included into a single broadcast stream between the owner Uo and the users Un, and the owner Uo may switch between any of the sources in real time to be provided to their users Un. As will be described in other sections, the owner Uo may utilize a virtual control room CRn to facilitate this process.

Figure 2:
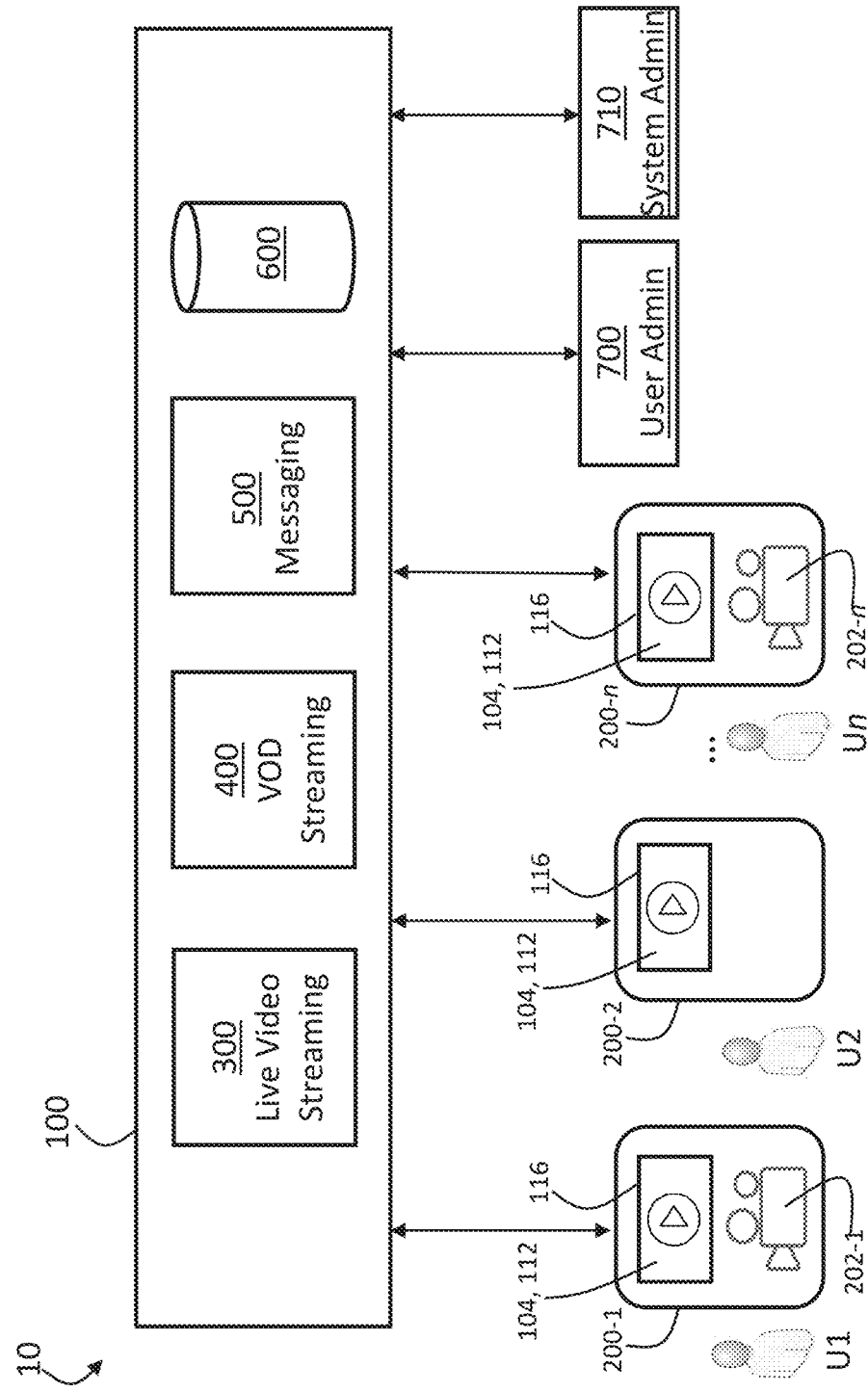

In one exemplary embodiment hereof as shown in FIG. 2, the cloud platform 100 may include a live video streaming system 300, a VOD streaming system 400, a messaging system 500, a database system 600 (including database management software such as Sequel Server or other types of databases, database systems or database management software) and other systems and elements as required for the system 10 to perform its fUnctionalities.

The database system 600 may store and generally manage content (e.g., live video, VOD, messaging, etc.), system data, client data, registered user data (i.e. participant data), engagement and tracking data, and other types of data. The platform 100 may also include any other types of software, software packages, software platforms or other types of software and systems that may enable system 10 to host, manage, analyze and maintain mobile applications, websites, social widgets, desktop applications, network applications, and other types of applications that may perform the functions of the system 10.

The live video streaming platform 300 may include one or more systems that may provide live video streaming functionalities. The system 300 may capture live video from each participant's camera 202 and the video streams may become content sources to be add to the broadcast stream. Then, at the discretion of the owner Uo, different video streams may be made available to the users Un. In one example, the default live video stream source may be the owner's Uo video stream, and this may be shared in real time with the users Un. In other examples, the owner Uo may choose to share a different users' Un video stream, and upon choosing this alternate source within the broadcast stream, the user's Un live video stream may be shared with the other users Un. In this way the participants Un may interact with the owner Uo and potentially with one another.

The VOD streaming platform 400 may include one or more systems that may provide VOD streaming functionalities. The VOD streaming system 400 may thereby be another source of content added to the broadcast stream. The VOD streaming system 400 may stream any type of content and/or media, including without limitation, video, audio, animation, graphics, games, augmented reality objects and environments, virtual reality objects and environments, other types of media and any combination thereof. The streaming content may be pre-recorded, live and/or near live. The user Uo may choose at any time to switch to the VOD source 400 to share VOD content to his/her users Un through the broadcast.

The messaging platform 500 may include one or more systems that may provide chat, e-mail, instant messaging (IM), social network feeds, voice, other types of messaging applications and/or technologies, and any combination thereof. In one embodiment, the messaging may be provided between the users Un simultaneously and in real time. In this way the owner Uo and the users Un may interact with one another via the messaging system 500 in real time while viewing the broadcast.

The system 10 may include an administrative interface 700 that the users Un may use to generally manage their accounts within the system 10. The admin 700 may include GUIs, websites, mobile applications, desktop applications, dialogs or other type of interfaces. For example, the admin 700 may include an interface that may reside on a particular website URL that may be integrated with cloud platform 100. The interface 700 may present a log-in page that may be used by each user Un to log into the system 10 (e.g., using log-in credentials). Each user Un may be provided a username and password (or other types of credentials) that they may enter to gain access to their particular administration information. Once logged in, the admin 700 may include tools required to manage their accounts with the system 10.

The system 10 may also include an admin interface 710 to allow the administrators, providers and/or operators of the system 10 to generally manage the system 10.

Figure 3:
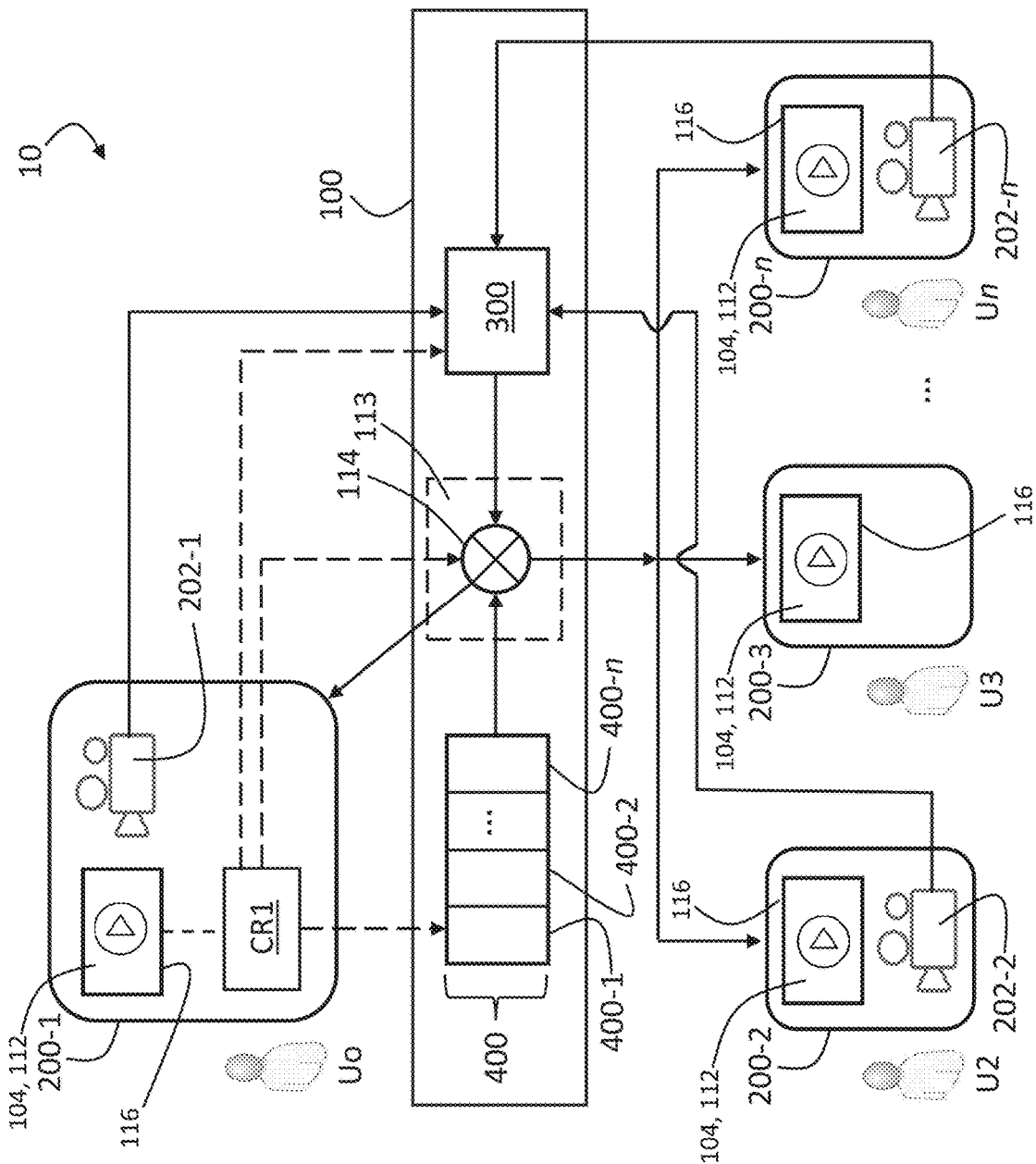

In one exemplary embodiment hereof as shown in FIG. 3, the system 10 may provide a virtual control room CRn for each registered owner Uo (e.g., the virtual control room CR1 owned and operated by user Uo). The virtual control rooms CRn may be integrated into the one or more websites 104 the system 10 may provide. The owner Uo of the control room CRn may log into the control room CRn and launch a live broadcast to his/her users Un. The control rooms CRn may also be integrated into one or more mobile applications 112 that may be downloaded and run on the users' devices 200. Each owner Uo may have their own control room CRn that other users may subscribe to and follow (e.g., interact with). The control room CRn may allow the owner Uo of the control room CRn to perform the following (without limitation) in real time:

1. Interact with their followers via interactive video broadcast;

2. Share live video streaming within the broadcast stream to the users Un;

3. Share video on demand (VOD) content within the broadcast stream from their library of videos and/or playlists to the users Un;

3. Share other users' Un live video streams within the broadcast stream with the other users Un;

4. Share other users' Un VOD content within the broadcast stream with the other users Un;

4. Share branded content (e.g., commercials) with the users Un;

5. Earn points (e.g., Pi points) by sharing the branded content;

6. Enable the users Un to earn points (e.g., Pi points) for watching the shared branded content; and 7. Control the content in a video stream (beyond opening a video stream) and to be able to change this content from different sources online;

8. Other functionalities.

As shown in FIG. 3, the system 10 may include a broadcast server 113 that may include a stream combining and selecting mechanism 114 (comprising software) that may combine various streaming data from different sources into a single broadcast. The control room CRn may then enable the owner Uo to select which streaming data from which particular source to share with his/her followers Un. For example, the broadcast server 113 and/or the stream combining and selecting mechanism 114 may combine video streaming data from each participant Un (e.g., from the video streaming system 300), VOD streaming data from the owner Uo and/or from the participants Un (e.g., from the VOD system 200) and any other types of data into one broadcast stream. The control room CRn may include the tools to enable the owner Uo to select which data from which source within the broadcast stream to stream to the followers Un.

Each control room CRn may be configured to enable control of the broadcast server 113, the stream combining and selecting mechanism 114, the video streaming system 300, the VOD system 400, and/or the messaging system 500 and any other systems of the system 10 as required. In this way, the CRn may be used to select what streaming data to present to one or more followers Un.

In one example, the owner of the control room CRn may choose to stream his/her live video stream from his/her camera 202, and upon choosing this, the broadcast server 113 and/or the stream combining and selecting mechanism 114 may add the owner's camera 202 as a source to the broadcast and stream the live video to the participants Un. The participants Un may then view the live video stream on their devices 200.

The owner Uo may then choose to share a VOD file 400-1 with his/her followers, at which time the broadcast server 113 and/or the stream combining and selecting mechanism 114 may set the VOD as a source and stream the chosen VOD file data 400-1 so that the followers Un may all view the VOD stream 400-1 on their devices 200. The owner Uo of each control room CRn may then switch back and forth at any moment as he/she may desire between interacting with his/her followers via their live video stream and/or via the VOD streaming in real time.

The owner Uo of the control room CRn (e.g., user Uo with CR1) may also enable VOD data from a different user Un (e.g., user U2) to be shared with the followers Un. In this case, a different VOD file 400 (e.g., VOD file 400-2 belonging to user U2) may be chosen and the broadcast server 113 and/or the stream combining and selecting mechanism 114 may set the new VOD as a source and stream the VOD 400-2 to the followers Un. For example, during a live show, a particular user Un may ask if they may share their VOD video with the other followers and the user Un may upload the video to the system 10. The owner Uo of the control room CRn may then select the user's VOD and the broadcast server 113 and/or the stream combining and selecting mechanism 114 may set the VOD file as the source within the broadcast and provide the VOD stream to the followers Un.

The owner Uo of a control room CRn may also choose to stream the live streaming video of a particular user Un to the followers Un, and upon selecting this, the broadcast server 113 and/or the stream combining and selecting mechanism 114 may set the user's live stream as a source and stream it to the followers Un.

Aspects of the system 10, of the control room CRn and of the users' interfaces will be described next with reference to an example workflow summary and FIGS. 4-11. In this example, the owner Uo may be user #3 and an example participant Un may be User #29 (U29) as depicted in the figures.

Figure 4:
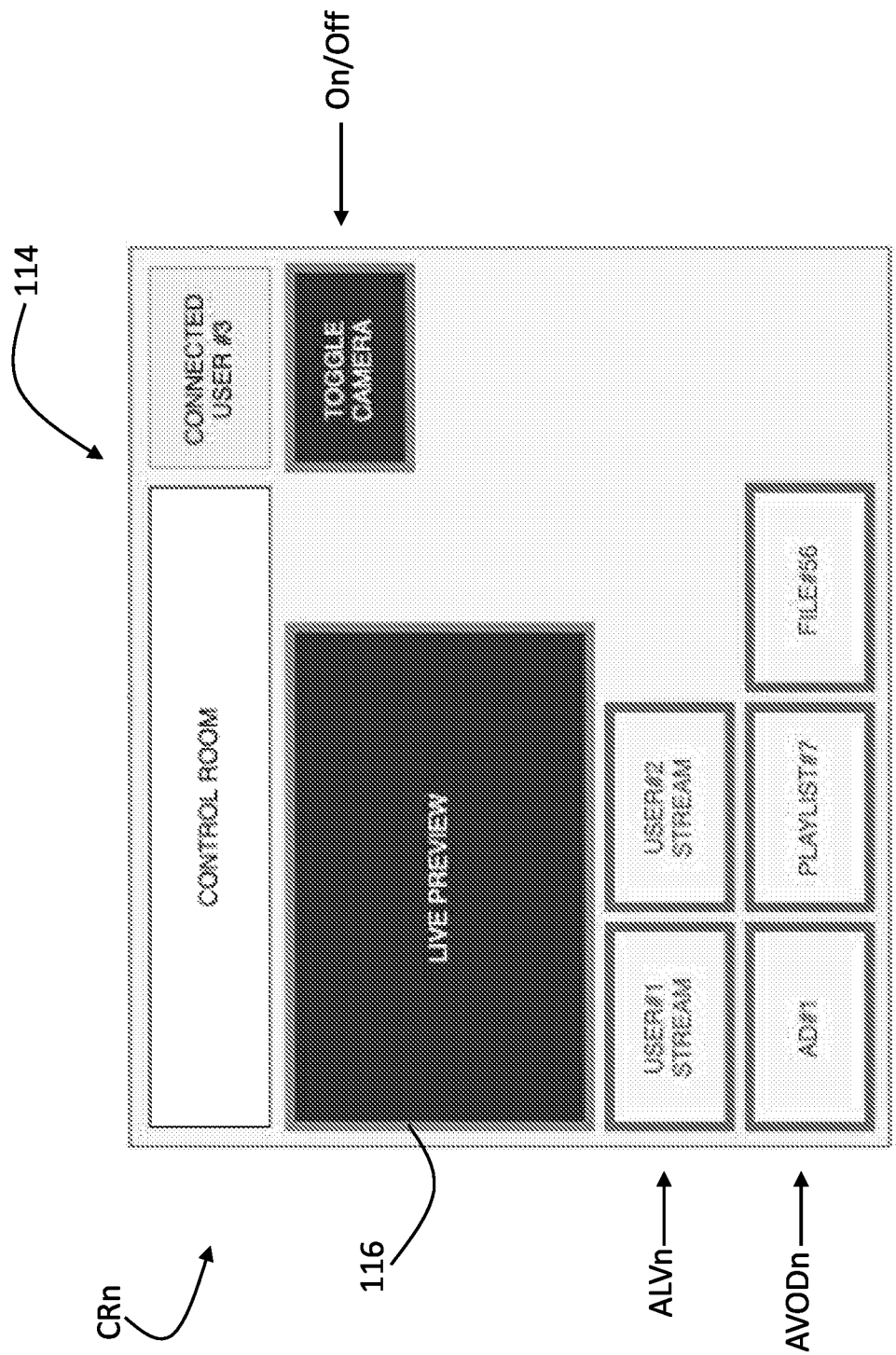
FIGS. 4-6 show aspects of an online broadcasting control room according to exemplary embodiments hereof.

In one exemplary embodiment as shown in FIG. 4, the control room CRn may include a GUI 114 that may include a video player 116 that may play a video stream provided by the cloud platform 100 (e.g., live video streaming video, VOD video, etc.). The GUI 114 may also display the available live video streams ALVn of each participant Un (e.g., the video streams of User #1 and User #2 taken from their respective cameras 202 as shown). The GUI 114 may also display the available VOD (AVOD) playlists, video files, sponsored content (e.g., AD #1, Playlist #7, File #56 as shown) that may be available for the owner Uo to share with the participants Un. Note that the AVOD icons (e.g., the playlist icon) may expand upon selection to show a multitude of available videos that may be included within the playlists. The CRn may also provide a camera On/Off mechanism On/Off that the owner Uo may use to turn on and off his/her camera 202. In the example shown in FIG. 4, the camera 202 may be turned off and as such, live video streaming of the owner Uo from the camera 202 may not be available to the owner Uo or to the participants Un.

Figure 5:
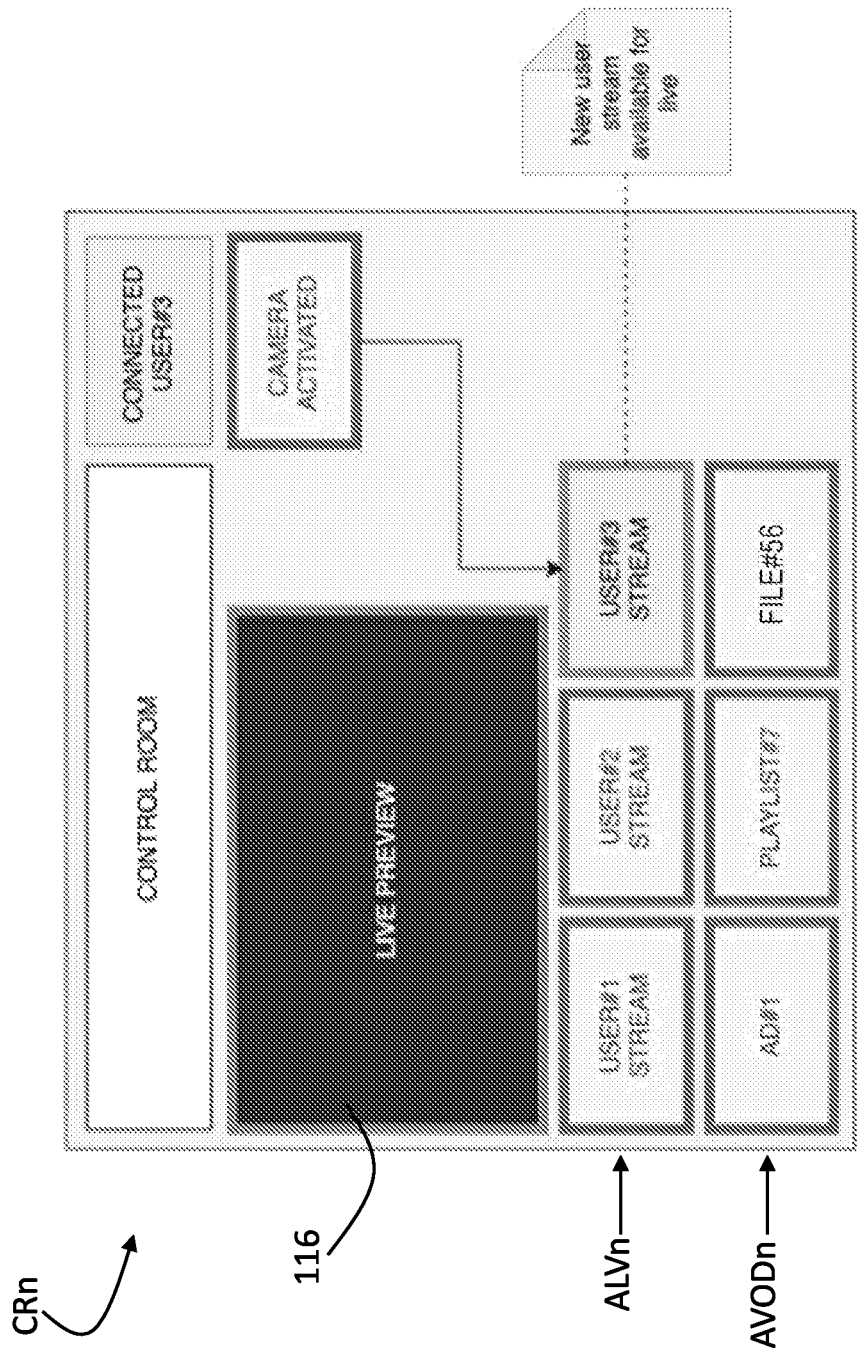
Figure 6:
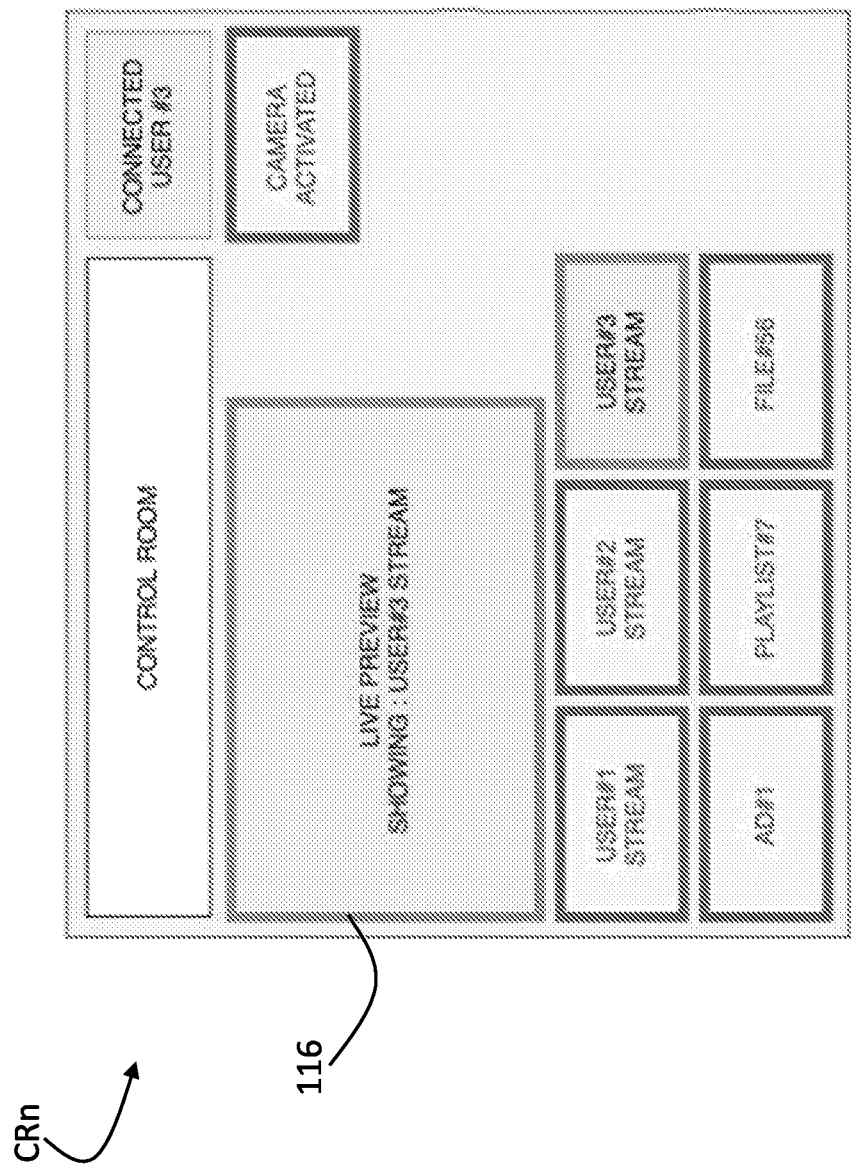
Figure 7:
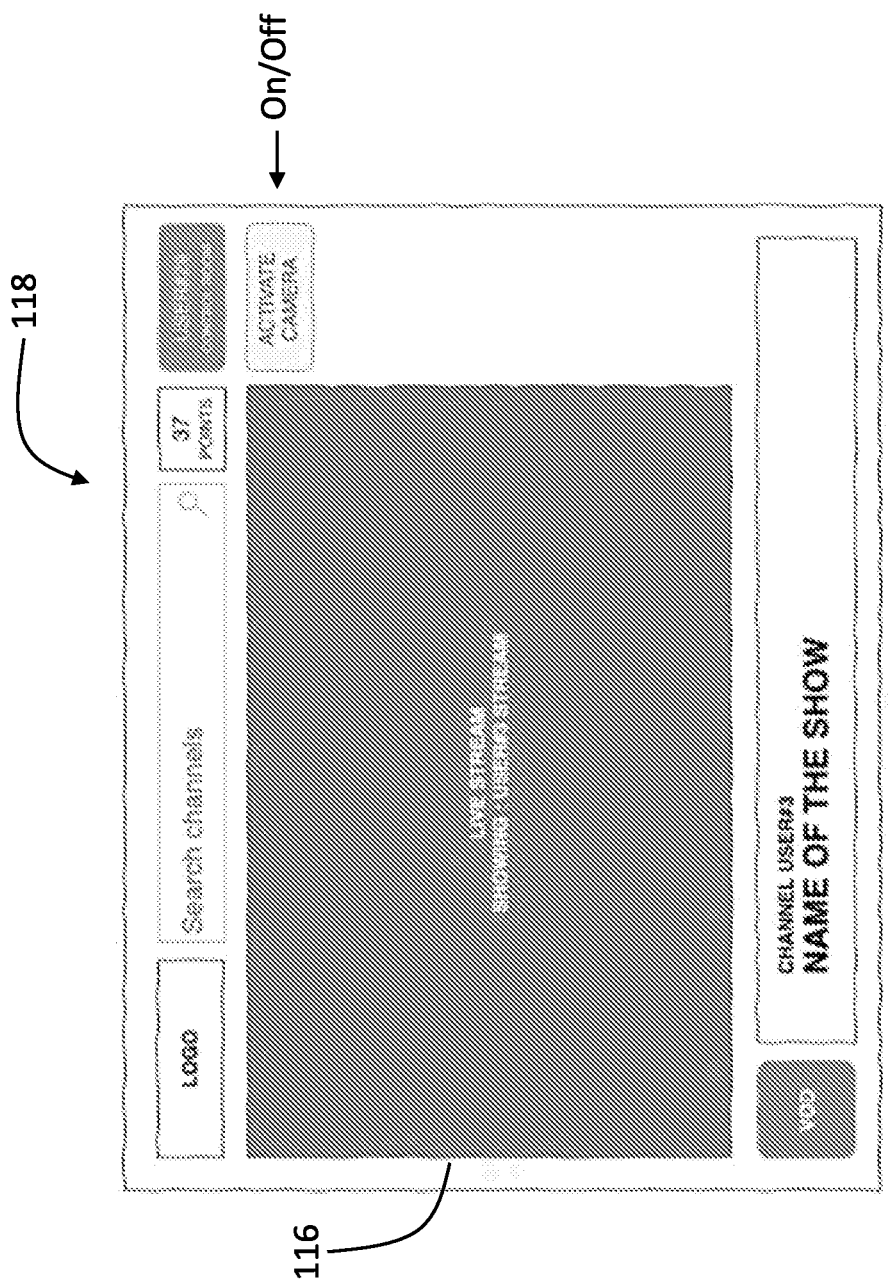
FIG. 7 shows aspects of a follower's graphical user interface according to exemplary embodiments hereof.

When the owner Uo may turn on his/her camera 202, the live video stream of the owner Uo from the camera 202 may appear in the available streams ALVn pane as shown in FIG. 5 (User #3 Stream as shown). Upon the owner Uo clicking on his/her live video stream in this pane, the broadcast server 113 and/or stream combining and selecting mechanism 114 may set the live video stream data from the owner's camera 202 (User #3 Stream) as a source within the broadcast stream and provide it to the owner Uo (as shown in FIG. 6) and to the participants Un (e.g., to User #29 as shown in FIG. 7). Note that FIG. 7 represents the GUI 118 that the system 10 may provide to the participants Un. The GUI 118 may include a video player 116, a camera on/off mechanism that the participant may use to turn on/off his/her camera 202, as well as other fUnctionalities and information.

Figure 8:
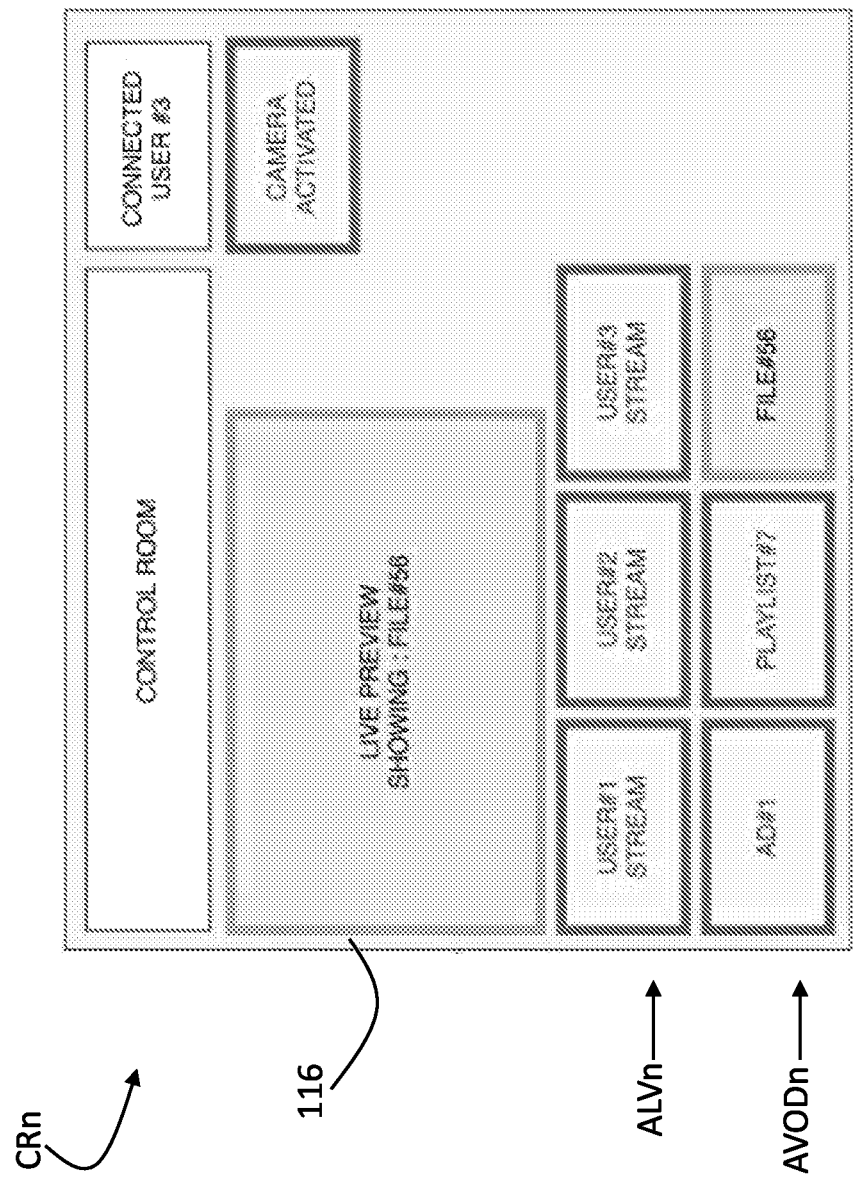
FIG. 8 shows aspects of an online broadcasting control room according to exemplary embodiments hereof.
Figure 9:
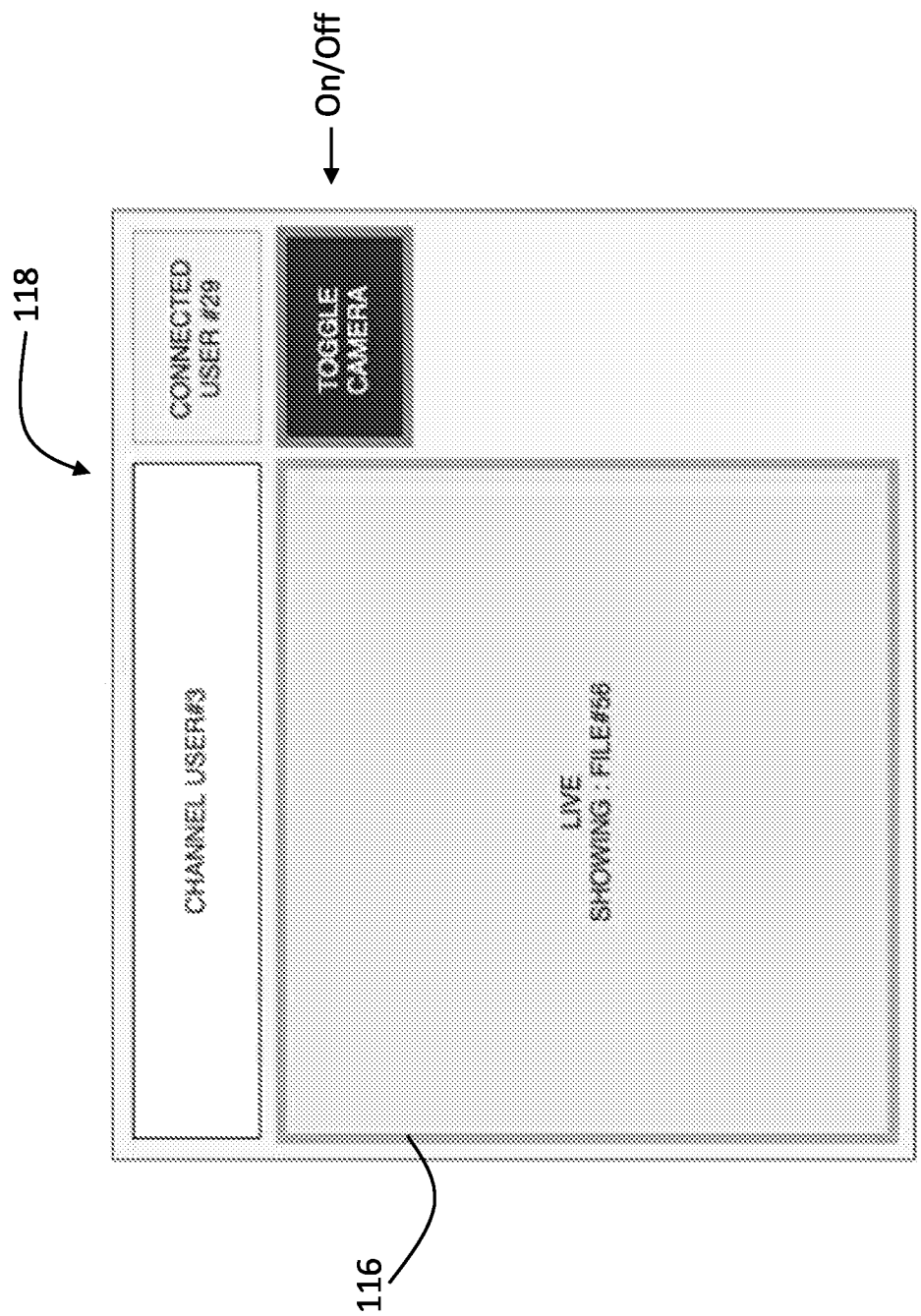
FIG. 9 shows aspects of a follower's graphical user interface according to exemplary embodiments hereof.

Next, if the owner Uo may wish to share a video file with the participants Un, the owner Uo may choose a video from his/her available videos AVODn (e.g., File #56 as shown in FIG. 8), and upon choosing the video, the broadcast server 113 and/or stream combining and selecting mechanism 114 may set the video as a source within the broadcast stream and provide it to the owner Uo to the participants Un. As shown in FIG. 8, the File #56 video may simultaneously play on the owner's Uo video player 116, and as shown in FIG. 9, the File #56 may play on the participants' Un video player 116 (e.g., User #29's video player 116). In addition, as shown in FIG. 8, the owner Uo may also simultaneously view the available live streams ALVn from each of the users Un so that he/she may watch the users' reactions as they view the streaming video.

Figure 10:
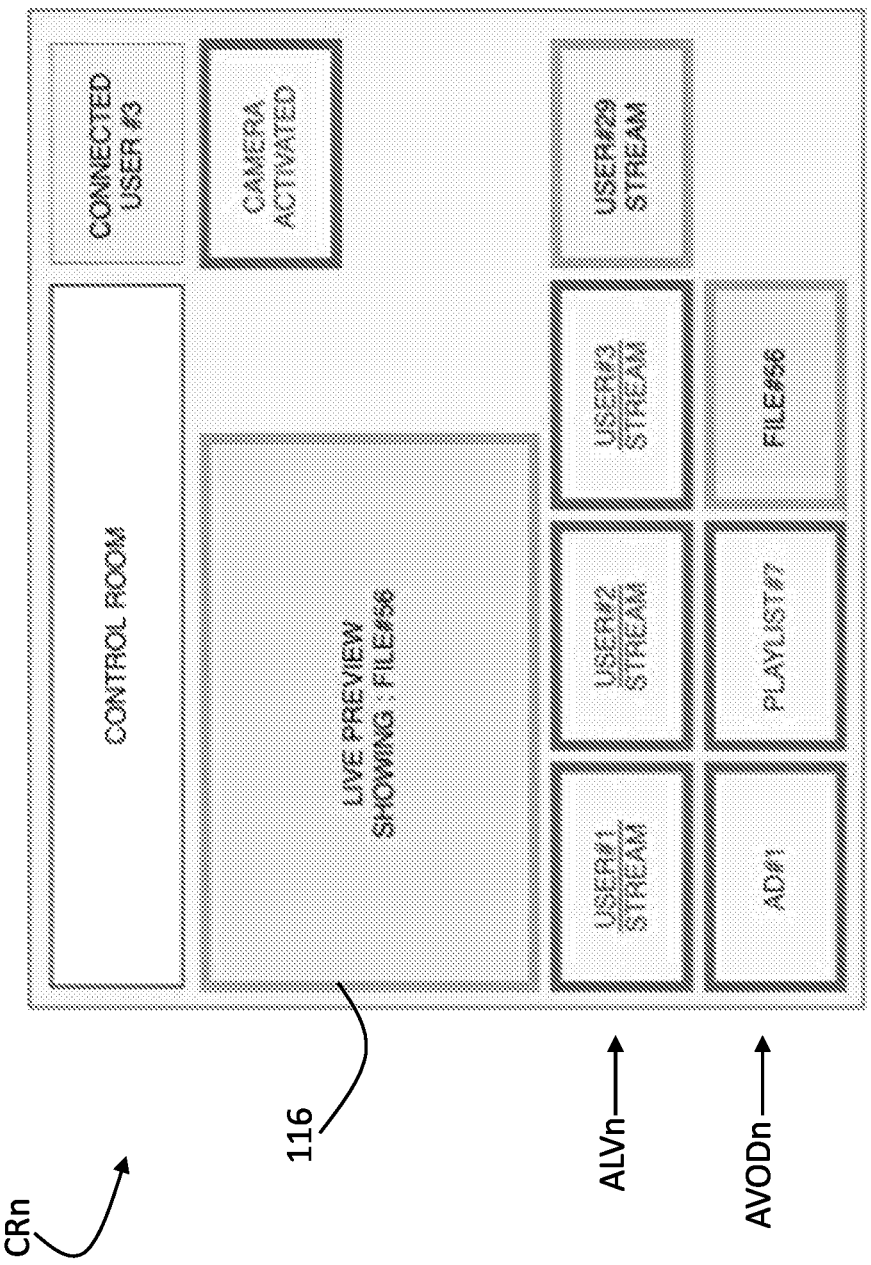
FIG. 10 shows aspects of an online broadcasting control room according to exemplary embodiments hereof.
Figure 11:
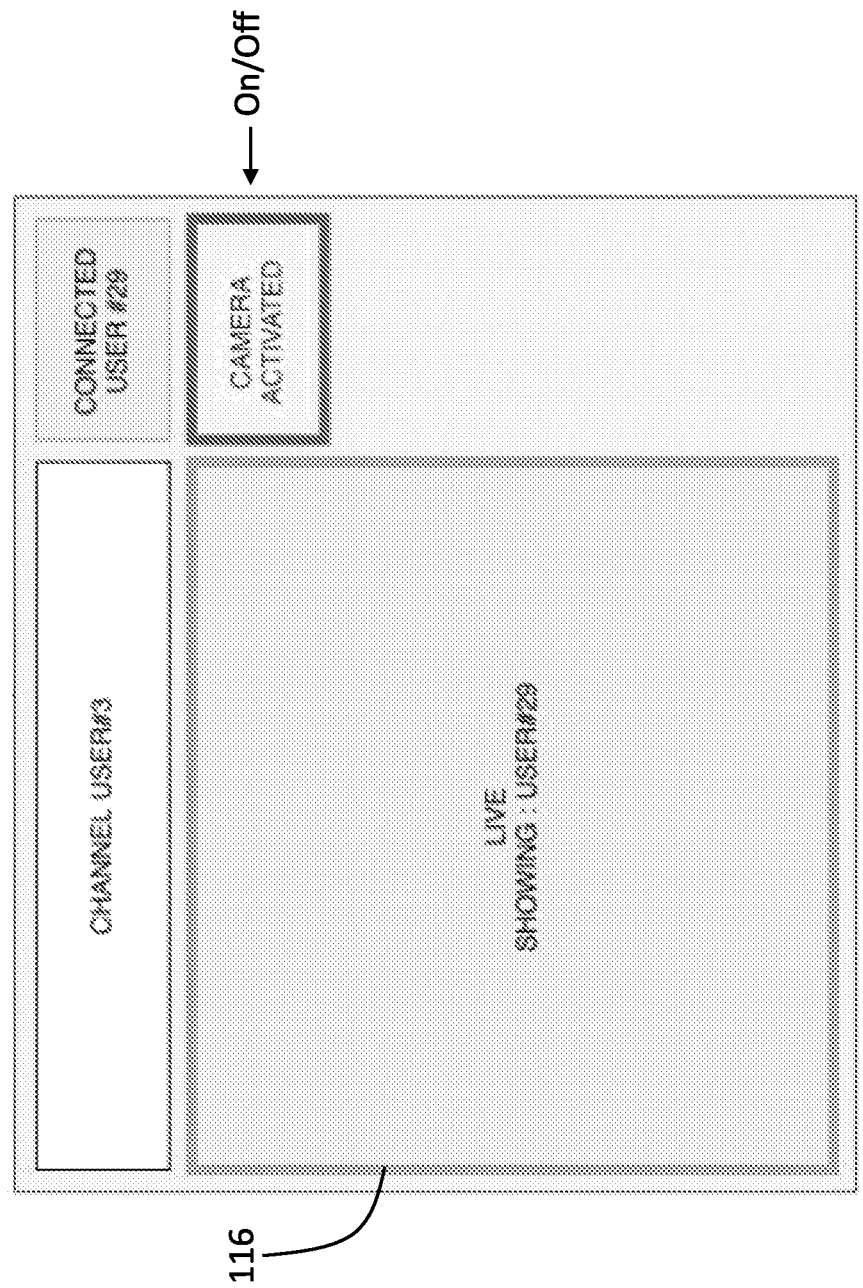
FIG. 11 shows aspects of a follower's graphical user interface according to exemplary embodiments hereof.

Next, if a participant Un may activate his/her camera 202 (e.g., User #29) the live video stream for this user Un taken by this user's camera 202 may appear in the control room ALVn pane as shown in FIG. 10. Then, if the owner Uo may choose this live video stream, the live video stream may be provided to the broadcast server 113 that may add it as a source, and then streamed to the owner Uo and to the participants Un (as shown in FIG. 11 for User #29).

In another exemplary embodiment hereof, a participant Un may provide video files to the system 10 that may be available for an owner Uo of a control room CRn to select and share with his/her followers Un. Once uploaded, these video VOD selections may appear in the owner's AVODn pane. For example, expanding on the example described above, File #56 may have been provided to the system 10 by a follower Un (not the owner Uo), made available to the owner Uo, chosen by the owner Uo, set as a source by the system 10 and streamed by the broadcast server 113 to the followers Un within the broadcast stream.

Figure 12:
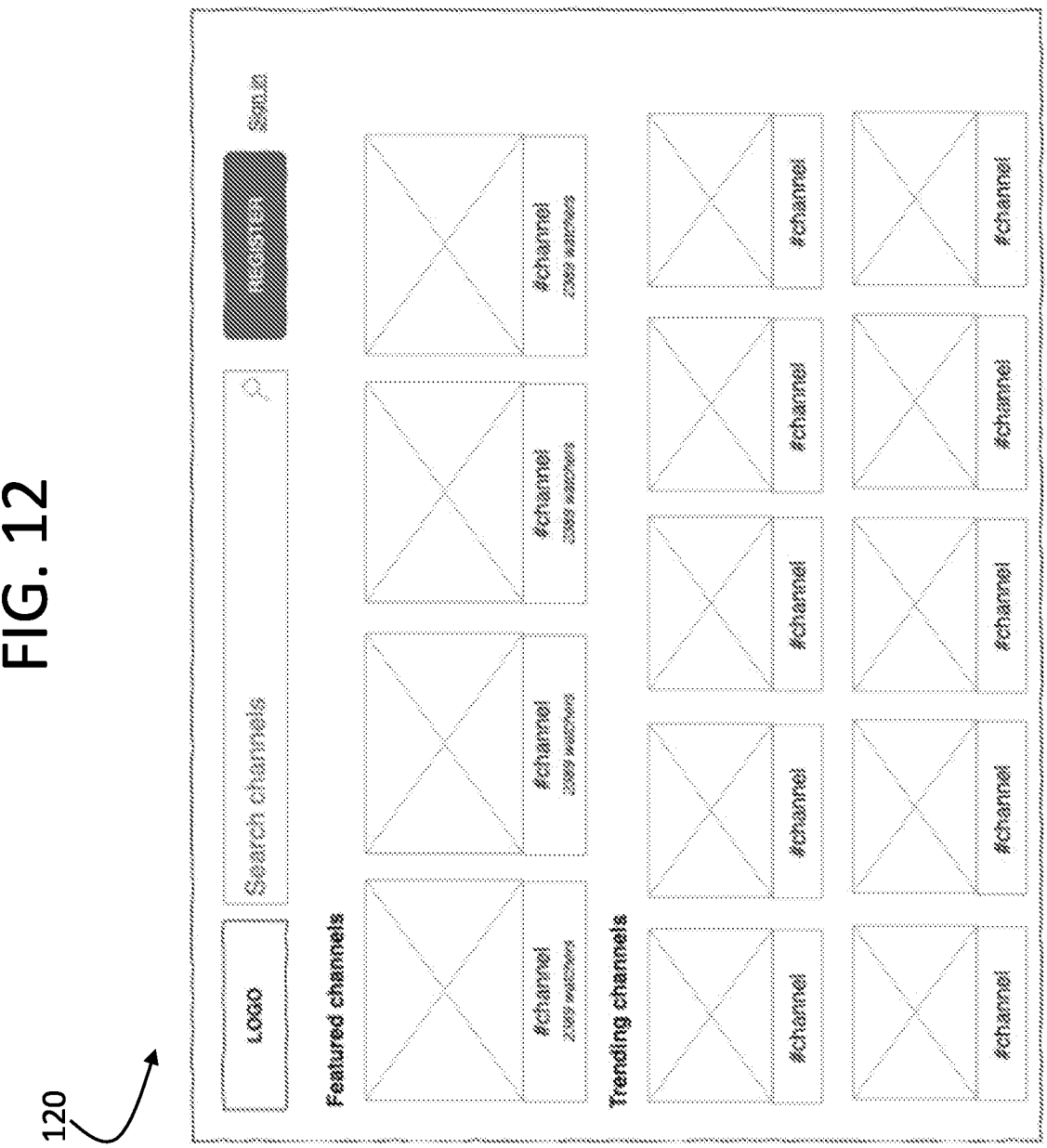
FIG. 12 shows aspects of a system homepage according to exemplary embodiments hereof.

As described earlier, the system 10 may provide one or more websites 104 that may provide access to the different broadcast channels (shows) that may be provided by one or more owners Uo of various control rooms CRn. In one exemplary embodiment hereof as shown in FIG. 12, the website 104 may include a homepage 120 that may display a variety of information such as "Featured Channels", "Trending Channels" and other information. The homepage 120 may also provide a search field that a user Un may use to search for a particular channel, a particular owner Uo, a particular video, etc. To participate with a particular channel, the user Un may simply choose the channel and begin the experience.

In one exemplary embodiment hereof, the owner Uo and/or a user Un may instruct the system 10 to record all or a portion of a live show (a live broadcast stream) and make it available as a VOD selection at a later date.

It is understood by a person of ordinary skill in the art, upon reading this specification, that the control room CRn and/or the user's GUI 118 may include other layouts, content and functionalities. For example, the user's GUI 118 may include two or more video players that may each show different video streams. In one example of this type, the user's GUI 118 may include one video player 116 to view the live streaming video of the owner Uo and a second video player 116 that may show a VOD selection made by the owner Uo. In another example, the user's GUI 118 may include additional video players 116 that may display the live video streams of some or all of the other users Un. In another example, the GUIs 118 may include a messaging box that may include group chats, text messaging, email and/or other types of messaging between the owner Uo and the users Un, between users Un and other users Un and any combination thereof. This added content may be at the discretion of the owner Uo or otherwise. It is understood that the control rooms CRn and/or the user's GUIs 118 may include any combination of the functionalities as described in this specification or otherwise, and that the scope of the system 10 is not limited in any way by the content that the CRn and/or the user's GUIs 118 may provide.

In addition, other videos, such as branded videos provided to the system 10, to the owners Uo and to the users Un by companies and brands, may be available to the owners of each control room CRn to share with their followers. In one example the videos may be commercials (or ads) for a particular brand and/or its products/services. In another example, the videos may be content sponsored by a particular brand. In any event, the owner of the room CRn may receive points for sharing the videos (e.g., Pi points), and the followers may receive points for watching the videos (e.g., Pi points). The owner Uo may also share sponsored videos provided by a particular user Un similar to as described above with relation to sharing a VOD from a particular user Un. The points may be continually collected and saved, by the owners Uo of the rooms and the followers Un, and used to purchase videos, goods, services or any other assets as available. In return for the exposure that this may provide the sponsors of the sponsored video, the sponsors may subsidize the goods, services and other assets that may be provided to the owners Uo and the users Un upon redemption of the points. The sponsors may also simply provide cash payment to the providers of the system 10 that may be allocated to the owners Uo, the users Un and to the providers of the system 10.

In one example, the system 10 may offer "Pi points" to owners Uo and to users Un for sharing and viewing sponsored videos. For example, an owner Uo may share a sponsored video for users Un to view and receive one Pi point for every one second of the video that is viewed by the users (in aggregate). In addition, the users Un may also each receive one Pi point for every second that they may each view. In this way, the system 10 may provide a revenue sharing model for the owners Uo and the users Un.

In one exemplary embodiment hereof, the owner Uo of a live broadcast may choose to periodically interject short sponsored videos (similar to commercials) during his/her broadcast for his/her followers Un to view. By doing so, the owner Uo and the users Un may all earn Pi points. When this happens, the users Un will each earn a Pi point for every second of video he/she may view, and the owner Uo may earn a Pi point for each second of video all of the users Un may view in aggregate.

In another exemplary embodiment hereof, the providers of the system 10 may also earn Pi points when the owners Uo share sponsored videos and when the users Un view sponsored videos. In one example, the providers of the system 10 may also earn one Pi point for every second of sponsored videos viewed by the users Un in aggregate. In this way, the revenue sharing may provide a business model for the providers of the system 10. And again, the sponsors of the sponsored videos will pay for the exposure that their brand may receive for the viewing of the sponsored videos.

Figure 13:
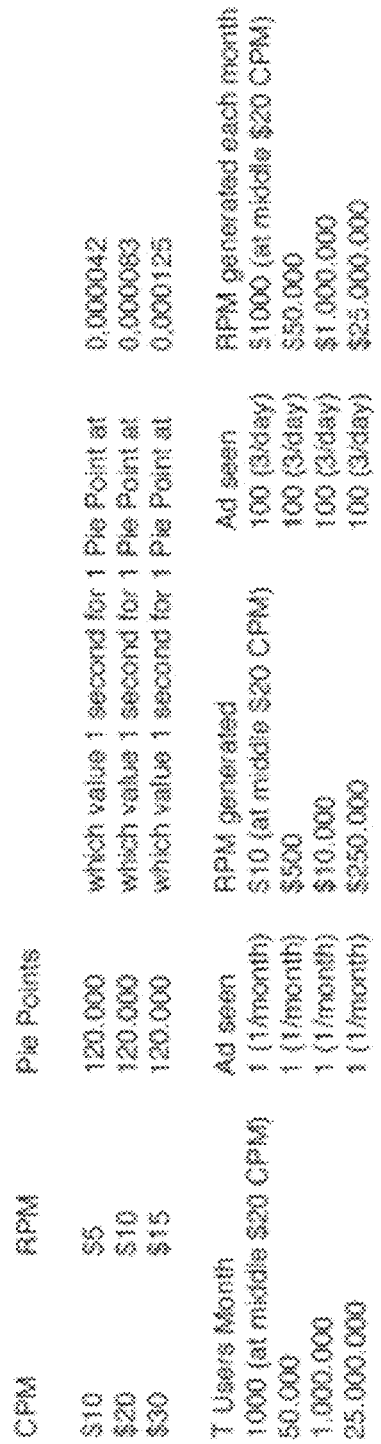
FIGS. 13-14 show CPM and RPM models according to exemplary embodiments hereof.

FIG. 13 shows a first example cost per thousand impressions (CPM), revenue per thousand (RPM) and resulting Pi points model.

Figure 14:
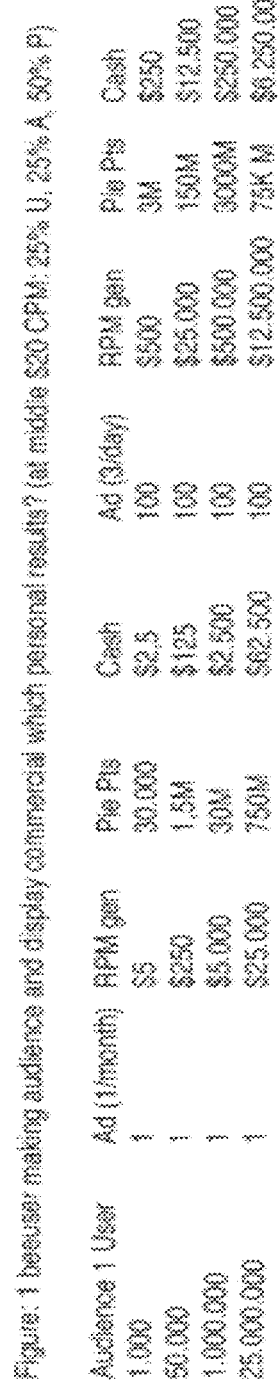

FIG. 14 shows a second example cost per thousand impressions (CPM), revenue per thousand (RPM) and resulting Pi points model.

FIGS. 15-19 show screenshots of example website pages provided by the system 10.

Figure 15:
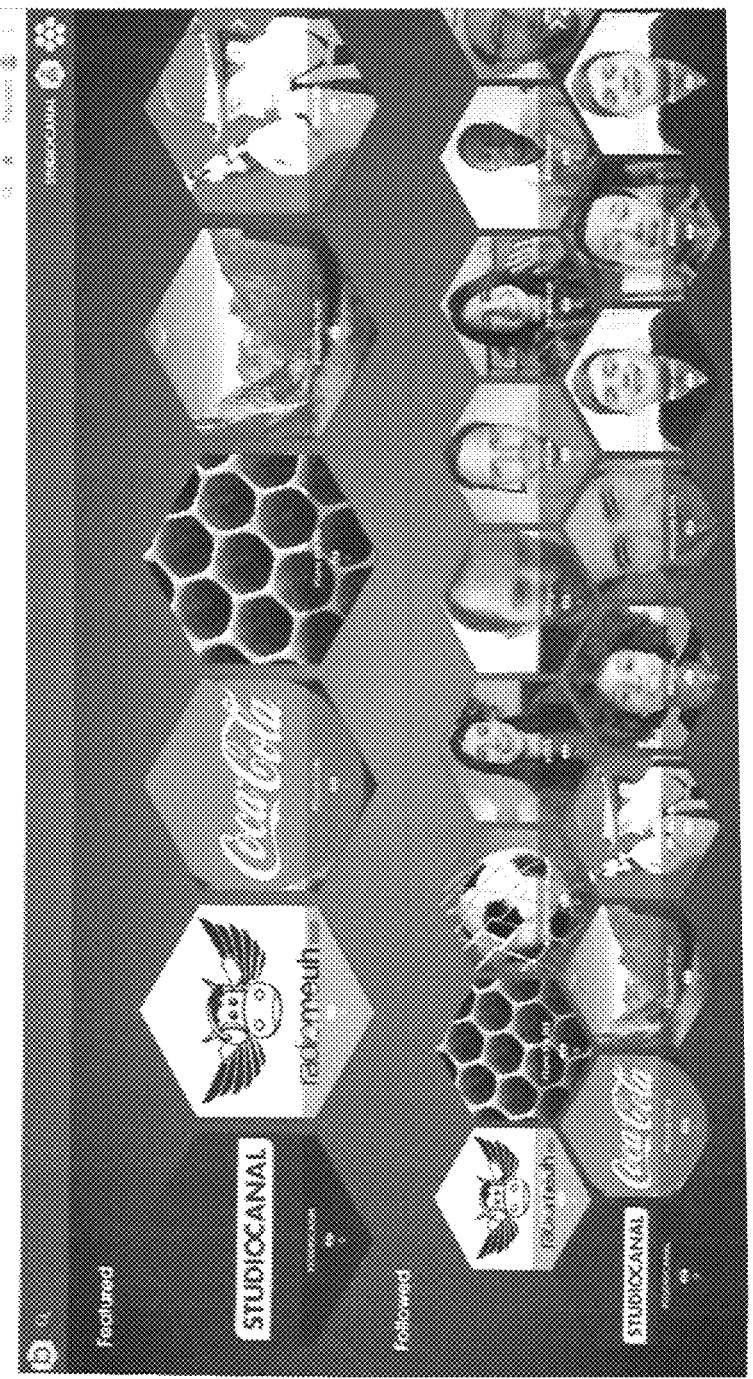
FIG. 15 shows aspects of a system homepage according to exemplary embodiments hereof.

FIG. 15 shows an example homepage (landing page) of the system 10 that shows "Featured Channels" and "Followed Channels" (channels that the particular user Un may be actively following).

Figure 16:
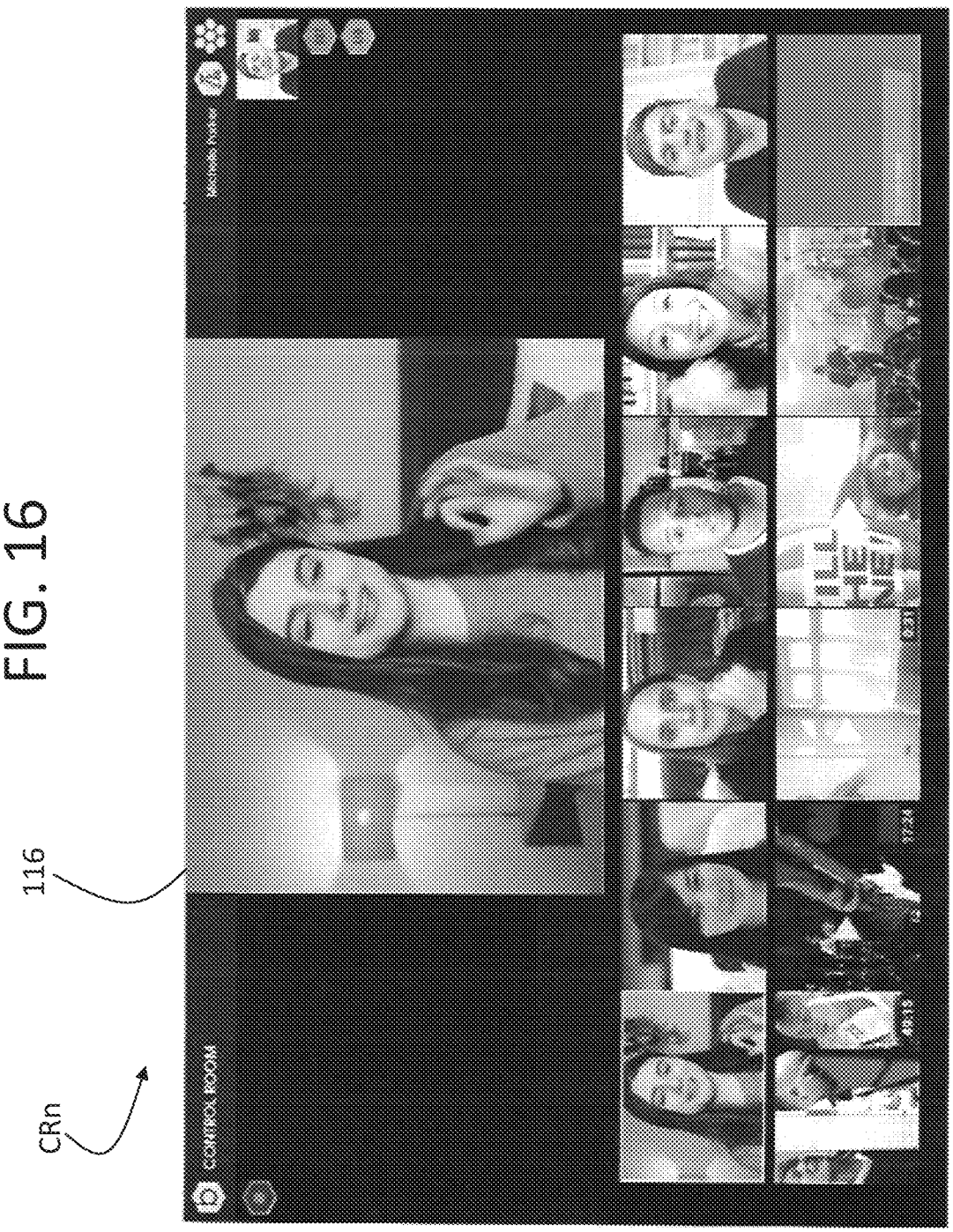
FIG. 16 shows aspects of an online broadcasting control room according to exemplary embodiments hereof.

FIG. 16 shows an example control room CRn of an owner Uo.

Figure 17:
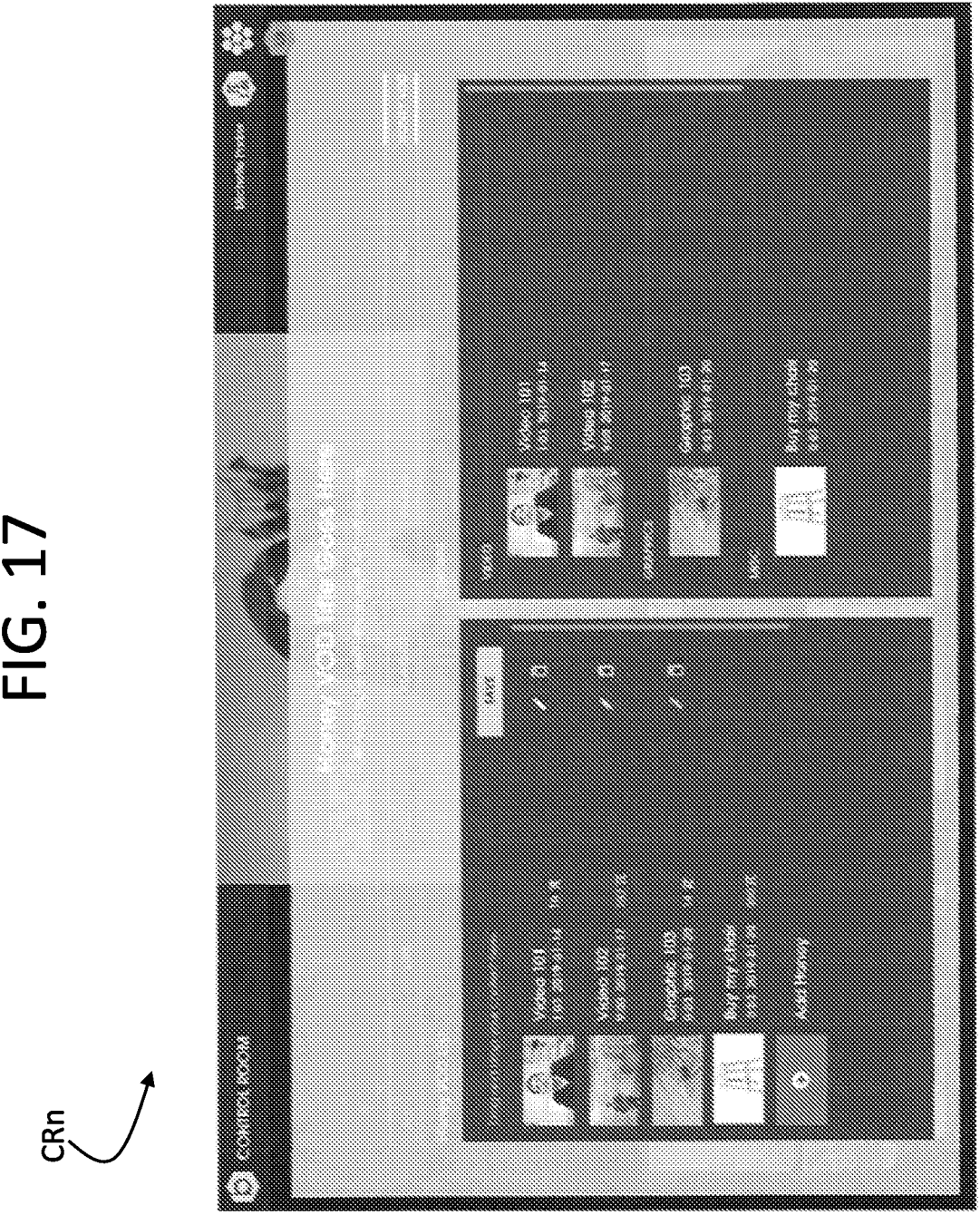
FIG. 17 shows aspects of a video on demand playlist according to exemplary embodiments hereof.

FIG. 17 shows an example expanded available VOD listing.

Figure 18:
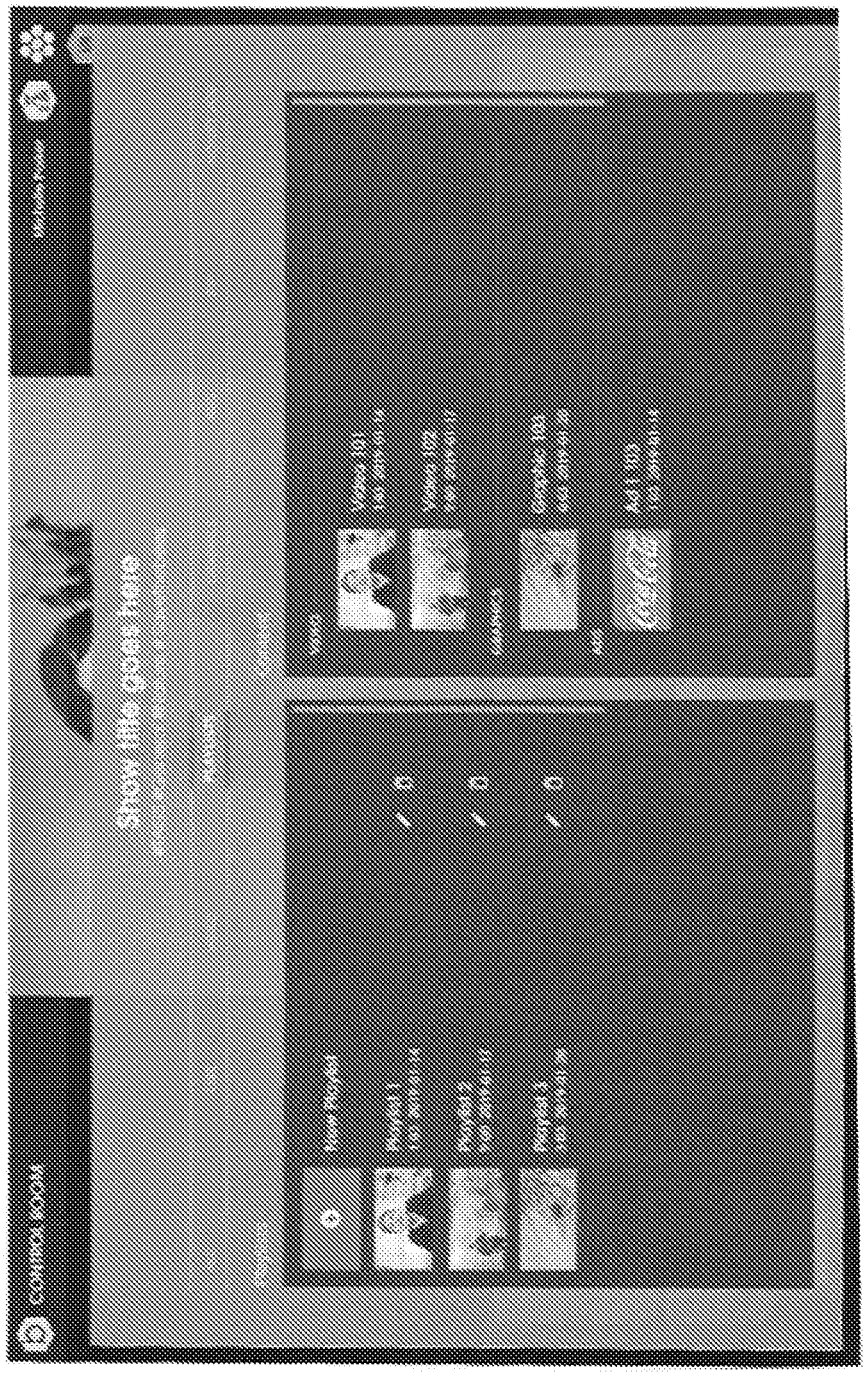
FIG. 18 shows aspects of an online show playlist according to exemplary embodiments hereof.

FIG. 18 shows an example expanded playlist.

Figure 19:
FIG. 19 shows aspects of a follower's graphical user interface according to exemplary embodiments hereof.

FIG. 19 shows an example user's GUI 118.

The functionalities, applications, services, mechanisms, operations, and acts shown and described above are implemented, at least in part, by software running on one or more computers (e.g., the cloud platform 100, backend systems 300, 400, 500. 600, user devices 200, etc.).

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and Understand, upon reading this description, that the various processes described herein may be implemented by, e.g., appropriately programmed computers, special purpose computers and computing devices. One or more such computers or computing devices may be referred to as a computer system.

Figure 20:
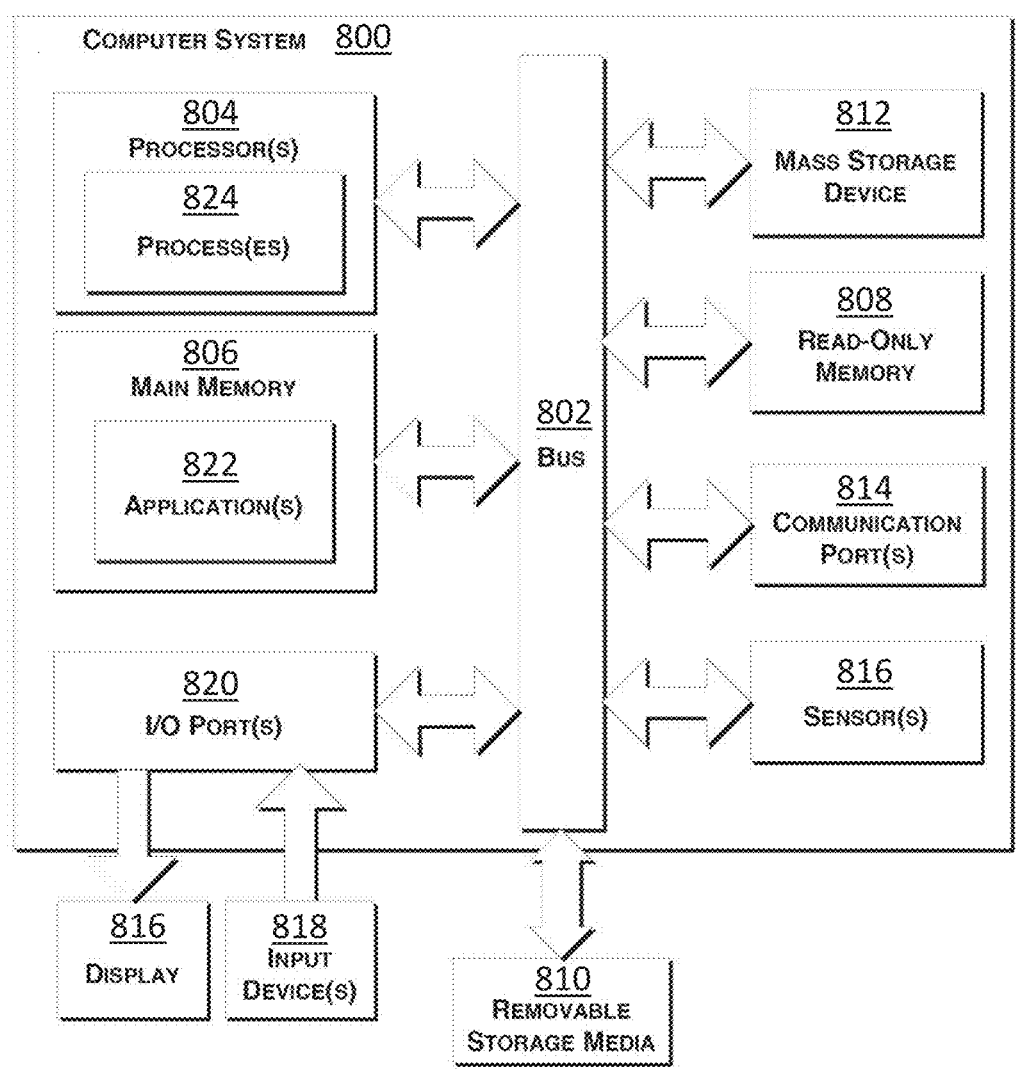
FIG. 20 shows aspects of a computing system according to exemplary embodiments hereof.

FIG. 20 is a schematic diagram of a computer system 800 upon which embodiments of the present disclosure may be implemented and carried out.

According to the present example, the computer system 800 includes a bus 802 (i.e., interconnect), one or more processors 804, a main memory 806, read-only memory 808, removable storage media 810, mass storage 812, and one or more communications ports 814. Communication port(s) 814 may be connected to one or more networks (not shown) by way of which the computer system 800 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 804 can be any known processor, such as, but not limited to, an Intel® Itanium® or Itanium 2® processor(s), AMD® Opteron® or Athlon MP® processor(s), or Motorola® lines of processors, and the like. Communications port(s) 814 can be any of an Ethernet port, a Gigabit port using copper or fiber, or a USB port, and the like. Communications port(s) 814 may be chosen depending on a network such as a Local Area Network (LAN), a Wide Area Network (WAN), or any network to which the computer system 800 connects. The computer system 800 may be in communication with peripheral devices (e.g., display screen 816, input device(s) 818) via Input/Output (I/O) port 820.

Main memory 806 can be Random Access Memory (RAM), or any other dynamic storage device(s) commonly known in the art. Read-only memory (ROM) 808 can be any static storage device(s) such as Programmable Read-Only Memory (PROM) chips for storing static information such as instructions for processor(s) 804. Mass storage 812 can be used to store information and instructions. For example, hard disk drives, an optical disc, an array of disks such as Redundant Array of Independent Disks (RAID), or any other mass storage devices may be used.

Bus 802 communicatively couples processor(s) 804 with the other memory, storage and communications blocks. Bus 802 can be a PCI/PCI-X, SCSI, a Universal Serial Bus (USB) based system bus (or other) depending on the storage devices used, and the like. Removable storage media 810 can be any kind of external storage, including hard-drives, floppy drives, USB drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements which are appropriate to perform the methods.

As shown, main memory 806 is encoded with application(s) 822 that support(s) the functionality as discussed herein (the application(s) 822 may be an application(s) that provides some or all of the functionality of the services/mechanisms described herein. Application(s) 822 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 804 accesses main memory 806 via the use of bus 802 in order to launch, run, execute, interpret or otherwise perform the logic instructions of the application(s) 822. Execution of application(s) 822 produces processing functionality of the service related to the application(s). In other words, the process(es) 824 represent one or more portions of the application(s) 822 performing within or upon the processor(s) 804 in the computer system 800.

It should be noted that, in addition to the process(es) 824 that carries (carry) out operations as discussed herein, other embodiments herein include the application 822 itself (i.e., the un-executed or non-performing logic instructions and/or data). The application 822 may be stored on a computer readable medium (e.g., a repository) such as a disk or in an optical medium. According to other embodiments, the application 822 can also be stored in a memory type system such as in firmware, read only memory (ROM), or, as in this example, as executable code within the main memory 806 (e.g., within Random Access Memory or RAM). For example, application(s) 822 may also be stored in removable storage media 810, read-only memory 808, and/or mass storage device 812.

Those of ordinary skill in the art will understand that the computer system 800 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and Understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be Understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, Unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A non-transitory computer readable medium, having stored thereon, instructions that when executed by a computing device, cause the computing device to perform operations for broadcasting media in a broadcasting system comprising a media stream combiner configured with at least one server, the operations comprising:
- (A) providing at a first client device associated with a first user, a first graphical user interface including a first primary video player, at least one live stream video player, and at least one video on demand video player, the at least one live stream video player and the at least one video on demand video player each selectable as individual user interface elements;
- (B) providing at a second client device associated with a second user, a second graphical user interface including a second primary video player;
- (C) providing to a first at least one live stream video player, a live stream video of the first user captured from the first client device;
- (D) providing to a second at least one live stream video player, a live stream video of the second user captured from the second client device;
- (E) providing to a first at least one video on demand video player, a video stream of a first video on demand video and/or an icon that represents the first video on demand video;
- (F) by the broadcasting system, receiving an indication of a selection of the first at least one live stream video players;
- (G) by the broadcasting system, when the indication of the selection of the first at least one live stream video players is received:
  - (H) identifying the live stream video of the selected first at least one live stream video players; and
  - (I) providing at the first primary video player, the live stream video identified in (H);
  - (J) providing at the second primary video player, the live stream video identified in (H);
- (K) by the broadcasting system, receiving an indication of a selection of the second at least one live stream video players;
- (L) by the broadcasting system, when the indication of the selection of the second at least one live stream video players is received:
  - (M) identifying the live stream video of the selected second at least one live stream video players; and
  - (N) providing at the first primary video player, the live stream video identified in (M);
  - (O) providing at the second primary video player, the live stream video identified in (M);
- (P) by the broadcasting system, receiving an indication of a selection of the first at least one video on demand video players;
- (Q) by the broadcasting system, when the indication of the selection of the first at least one video on demand video players is received:
  - (R) identifying the on demand video of the selected first at least one video on demand video players; and
  - (S) providing at the first primary video player, the video on demand video identified in (R);
  - (T) providing at the second primary video player, the video on demand video identified in (R).

2. The non-transitory computer readable medium of claim 1, the operations further comprising:
- (U) receiving from the second client device a second video on demand video;
- (V) providing to a second at least one video on demand video player, a video stream of the second video on demand video and/or an icon that represents the second video on demand video;
- (W) by the broadcasting system, receiving an indication of a selection of the second at least one video on demand video players;
- (X) by the broadcasting system, when the indication of the selection of the second at least one video on demand video players is received:
  - (Y) identifying the on demand video of the selected second at least one video on demand video players; and
  - (Z) providing at the first primary video player, the video on demand video identified in (Y);
  - (AA) providing at the second primary video player, the video on demand video identified in (Y).

3. The non-transitory computer readable medium of claim 1 wherein the providing the live stream video identified in (M) at the first primary video player in (N) includes toggling between providing the live stream video identified in (H) and the live stream video identified in (M).

4. The non-transitory computer readable medium of claim 1 wherein the providing the live stream video identified in (M) at the second primary video player in (O) includes toggling between providing the live stream video identified in (H) and the live stream video identified in (M).

5. The non-transitory computer readable medium of claim 1 wherein the providing the video on demand video identified in (R) at the first primary video player in (S) includes toggling between providing the live stream video identified in (M) and the video on demand video identified in (R).

6. The non-transitory computer readable medium of claim 1 wherein the providing the video on demand video identified in (R) at the second primary video player in (T) includes toggling between providing the live stream video identified in (M) and the video on demand video identified in (R).

7. The non-transitory computer readable medium of claim 1 wherein the first graphical user interface includes an online control room.

8. The non-transitory computer readable medium of claim 1, the operations further comprising:
- (U) providing a database adapted to store information relating to the engagement of the first user and/or the second user with the first video on demand video; and
- (V) using the database to store information relating to the engagement of the first user and/or the second user with the first video on demand video.

9. The non-transitory computer-readable medium of claim 8, the operations further comprising:
- (W) allotting points to the first user and/or the second user based at least in part on the information stored in the database.

10. The non-transitory computer-readable medium of claim 2, the operations further comprising:
- (BB) providing a database with the at least one server adapted to store information relating to the engagement of the first user and/or the second user with the second video on demand video; and
- (CC) using the database to store information relating to the engagement of the first user and/or the second user with the second video on demand video.

11. The non-transitory computer-readable medium of claim 10, the operations further comprising:
- (DD) allotting points to the first user and/or the second user based at least in part on the information stored in the database.

12. A non-transitory computer readable medium, having stored thereon, instructions that when executed by a computing device, cause the computing device to perform operations for broadcasting media in a broadcasting system comprising a media stream combiner configured with at least one server, the operations consisting essentially of:
  (A) providing at a first client device associated with a first user, a first graphical user interface including a first primary video player, at least one live stream video player, and at least one video on demand video player, the at least one live stream video player and the at least one video on demand video player each selectable as individual user interface elements;
  (B) providing at a second client device associated with a second user, a second graphical user interface including a second primary video player;
  (C) providing to a first at least one live stream video player, a live stream video of the first user captured from the first client device;
  (D) providing to a second at least one live stream video player, a live stream video of the second user captured from the second client device;
  (E) providing to a first at least one video on demand video player, a video stream of a first video on demand video and/or an icon that represents the first video on demand video;
  (F) by the broadcasting system, receiving an indication of a selection of the first at least one live stream video players;
  (G) by the broadcasting system, when the indication of the selection of the first at least one live stream video players is received:
    (H) identifying the live stream video of the selected first at least one live stream video players; and
    (I) providing at the first primary video player, the live stream video identified in (H);
    (J) providing at the second primary video player, the live stream video identified in (H);
  (K) by the broadcasting system, receiving an indication of a selection of the second at least one live stream video players;
  (L) by the broadcasting system, when the indication of the selection of the second at least one live stream video players is received:
    (M) identifying the live stream video of the selected second at least one live stream video players; and
    (N) providing at the first primary video player, the live stream video identified in (M);
    (O) providing at the second primary video player, the live stream video identified in (M);
  (P) by the broadcasting system, receiving an indication of a selection of the first at least one video on demand video players;
  (Q) by the broadcasting system, when the indication of the selection of the first at least one video on demand video players is received:
    (R) identifying the on demand video of the selected first at least one video on demand video players; and
    (S) providing at the first primary video player, the video on demand video identified in (R);
    (T) providing at the second primary video player, the video on demand video identified in (R).

13. The non-transitory computer readable medium of claim 12, the operations further consisting essentially of:
  (U) receiving from the second client device a second video on demand video;
  (V) providing to a second at least one video on demand video player, a video stream of the second video on demand video and/or an icon that represents the second video on demand video;
  (W) by the broadcasting system, receiving an indication of a selection of the second at least one video on demand video players;
  (X) by the broadcasting system, when the indication of the selection of the second at least one video on demand video players is received:
    (Y) identifying the on demand video of the selected second at least one video on demand video players; and
    (Z) providing at the first primary video player, the video on demand video identified in (Y);
    (AA) providing at the second primary video player, the video on demand video identified in (Y).

14. The non-transitory computer readable medium of claim 12 wherein the providing the live stream video identified in (M) at the first primary video player in (N) includes toggling between providing the live stream video identified in (H) and the live stream video identified in (M).

15. The non-transitory computer readable medium of claim 12 wherein the providing the live stream video identified in (M) at the second primary video player in (O) includes toggling between providing the live stream video identified in (H) and the live stream video identified in (M).

16. The non-transitory computer readable medium of claim 12 wherein the providing the video on demand video identified in (R) at the first primary video player in (S) includes toggling between providing the live stream video identified in (M) and the video on demand video identified in (R).

17. The non-transitory computer readable medium of claim 12 wherein the providing the video on demand video identified in (R) at the second primary video player in (T) includes toggling between providing the live stream video identified in (M) and the video on demand video identified in (R).

18. The non-transitory computer readable medium of claim 12 wherein the first graphical user interface includes an online control room.

19. The non-transitory computer readable medium of claim 12, the operations further consisting essentially of:
  (U) providing a database adapted to store information relating to the engagement of the first user and/or the second user with the first video on demand video; and
  (V) using the database to store information relating to the engagement of the first user and/or the second user with the first video on demand video.

20. The non-transitory computer-readable medium of claim 19, the operations further consisting essentially of:
  (W) allotting points to the first user and/or the second user based at least in part on the information stored in the database.

* * * * *